US012689664B2

(12) United States Patent
Circosta et al.

(10) Patent No.: US 12,689,664 B2
(45) Date of Patent: Jul. 21, 2026

(54) CRYPTOGRAPHIC PARTICIPANT VOUCHING

(71) Applicant: Apple Inc., Cupertino, CA (US)

(72) Inventors: Nicholas J. Circosta, Mountain View, CA (US); Adam Y. Syed, Sunnyvale, CA (US); Andrew J. Daley, Santa Clara, CA (US); Andrew J. Ringer, Scotts Valley, CA (US); Frederic Jacobs, St. Sulpice (CH); Jad Osseiran, San Francisco, CA (US); Justin R. Etzine, San Jose, CA (US); Mark M. Xue, Berkeley, CA (US); Nelson M. Leduc, San Jose, CA (US); Robert B. Mcindoe, San Jose, CA (US); Zak C. Wegweiser, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/130,394

(22) Filed: Apr. 3, 2023

(65) Prior Publication Data

US 2023/0396658 A1      Dec. 7, 2023

Related U.S. Application Data

(60) Provisional application No. 63/349,041, filed on Jun. 3, 2022.

(51) Int. Cl.
*H04L 65/1093* (2022.01)
*H04L 9/32* (2006.01)
*H04L 9/40* (2022.01)
*H04L 65/1076* (2022.01)

(52) U.S. Cl.
CPC ........ *H04L 65/1093* (2013.01); *H04L 9/3247* (2013.01); *H04L 63/102* (2013.01); *H04L 65/1076* (2013.01)

(58) Field of Classification Search
CPC . H04L 65/1093; H04L 9/3247; H04L 63/102; H04L 65/1076
See application file for complete search history.

(56) References Cited

U.S. PATENT DOCUMENTS

| | | | | |
|---|---|---|---|---|
| 7,623,469 | B2 * | 11/2009 | Kuure | H04W 48/16 |
| | | | | 370/252 |
| 8,990,329 | B1 * | 3/2015 | Khvostichenko | H04L 63/101 |
| | | | | 709/206 |
| 9,973,543 | B2 * | 5/2018 | Chitroda | H04L 65/1094 |
| 11,100,548 | B1 * | 8/2021 | Gray | H04M 3/5183 |
| 11,336,455 | B2 | 5/2022 | Ford | |

(Continued)

*Primary Examiner* — Nicholas R Taylor
*Assistant Examiner* — Angela Widhalm De Rodriguez
(74) *Attorney, Agent, or Firm* — BAKERHOSTETLER

(57) ABSTRACT

Aspects of the subject technology include receiving, by a first device, a voucher data item, from a second device that is participating in a group communication session with at least a third device and providing, by the first device, the voucher data item to at least the third device to verify that the first device is vouched for by the second device for participation in the group communication session. The voucher data item may include participant information associated with participation of the second device in the group communication session. The voucher data item may also be signed with a key associated with the second device.

20 Claims, 7 Drawing Sheets

(56) References Cited

U.S. PATENT DOCUMENTS

| | | | |
|---|---|---|---|
| 2004/0131187 A1 | 7/2004 | Takao | |
| 2011/0103265 A1* | 5/2011 | Dilipkumar Saklikar | .................. H04L 63/0815 370/352 |
| 2014/0106721 A1* | 4/2014 | Calman | .............. H04L 12/1818 455/416 |
| 2014/0372290 A1* | 12/2014 | Khaef | ................. G06Q 20/223 709/204 |
| 2017/0012950 A1* | 1/2017 | Kim | ........................ H04W 4/12 |
| 2022/0085984 A1* | 3/2022 | Khandani | ............ H04L 9/0822 |
| 2022/0116231 A1 | 4/2022 | Cho | |
| 2022/0294643 A1 | 9/2022 | Wang | |
| 2022/0376895 A1 | 11/2022 | Booth | |
| 2023/0065364 A1 | 3/2023 | Aichinger | |
| 2023/0139813 A1 | 5/2023 | Thiel | |
| 2023/0353608 A1 | 11/2023 | Mayfield | |
| 2024/0073031 A1 | 2/2024 | Park | |

* cited by examiner

500

RECEIVE, BY A FIRST DEVICE, A VOUCHER DATA ITEM FROM A SECOND DEVICE THAT IS PARTICIPATING IN A GROUP COMMUNICATION SESSION WITH AT LEAST A THIRD DEVICE — 502

PROVIDE, BY THE FIRST DEVICE, THE VOUCHER DATA ITEM TO AT LEAST THE THIRD DEVICE TO VERIFY THAT THE FIRST DEVICE IS VOUCHED FOR BY THE SECOND DEVICE FOR PARTICIPATION IN THE GROUP COMMUNICATION SESSION — 504

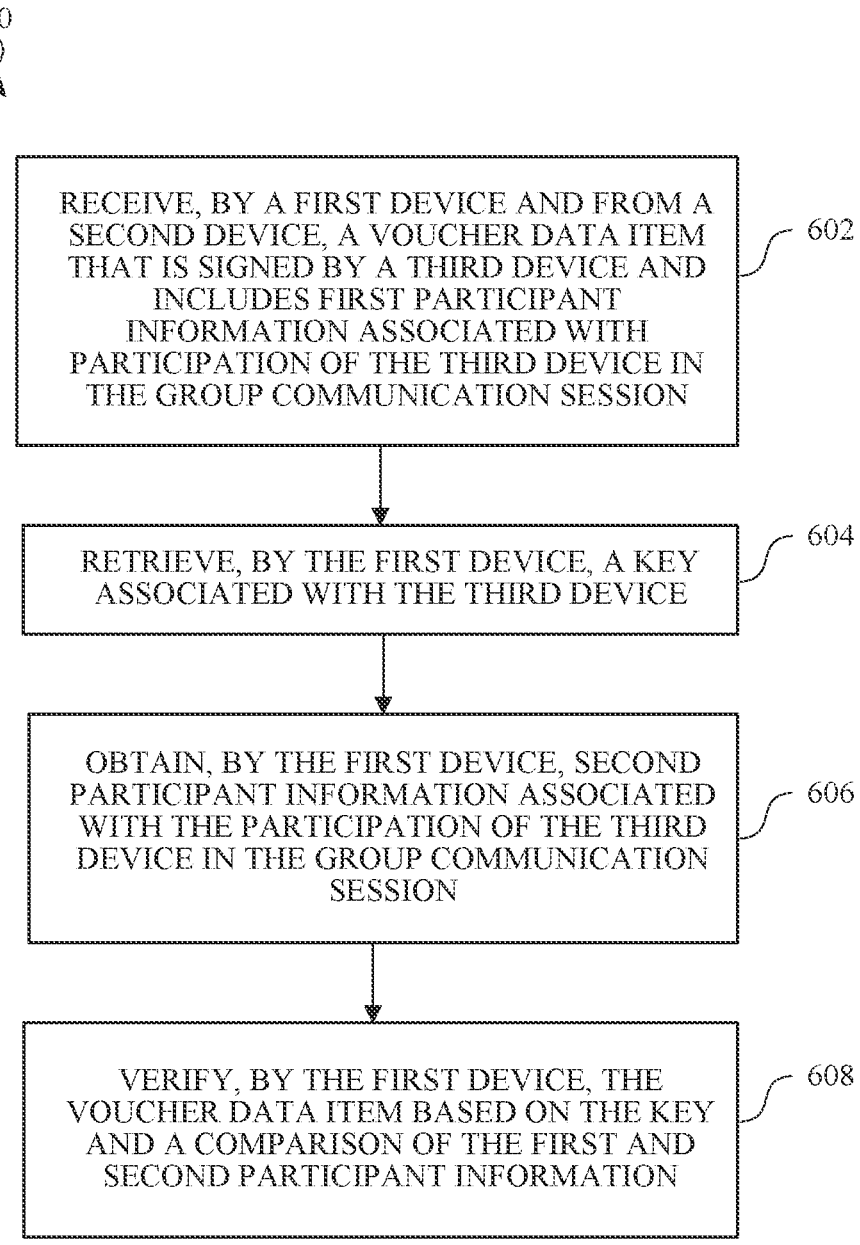

600

RECEIVE, BY A FIRST DEVICE AND FROM A SECOND DEVICE, A VOUCHER DATA ITEM THAT IS SIGNED BY A THIRD DEVICE AND INCLUDES FIRST PARTICIPANT INFORMATION ASSOCIATED WITH PARTICIPATION OF THE THIRD DEVICE IN THE GROUP COMMUNICATION SESSION — 602

RETRIEVE, BY THE FIRST DEVICE, A KEY ASSOCIATED WITH THE THIRD DEVICE — 604

OBTAIN, BY THE FIRST DEVICE, SECOND PARTICIPANT INFORMATION ASSOCIATED WITH THE PARTICIPATION OF THE THIRD DEVICE IN THE GROUP COMMUNICATION SESSION — 606

VERIFY, BY THE FIRST DEVICE, THE VOUCHER DATA ITEM BASED ON THE KEY AND A COMPARISON OF THE FIRST AND SECOND PARTICIPANT INFORMATION — 608

*FIG. 6*

CRYPTOGRAPHIC PARTICIPANT VOUCHING

CROSS-REFERENCE TO RELATED APPLICATIONS

The present application claims the benefit of U.S. Provisional Patent Application Ser. No. 63/349,041, entitled "CRYPTOGRAPHIC PARTICIPANT VOUCHING," filed Jun. 3, 2022, which is hereby incorporated herein by reference in its entirety and made part of the present U.S. Utility Patent Application for all purposes.

TECHNICAL FIELD

The present description generally relates to group communications on electronic devices and, more particularly, to cryptographic participant vouching.

BACKGROUND

An electronic device such as a laptop, tablet, or smartphone, may be configured to participate in group communication sessions. Video communication sessions, for example, allow people in remote locations to view a video stream of each other in real-time.

BRIEF DESCRIPTION OF THE DRAWINGS

Certain features of the subject technology are set forth in the appended claims. However, for the purpose of explanation, several implementations of the subject technology are set forth in the following figures.

FIG. 6 depicts a flow diagram of an example process for validating a voucher by a first device that is participating in a group communication session, in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices may be configured to send and receive data between each other to participate in communication sessions (e.g., video calls, audio calls, and/or the like) with one or more other similarly configured electronic devices. A participant in a communication session may have access to other electronic devices (e.g., smartphone, laptop, tablet, and/or the like) that may be used to participate in a communication session. However, the participant may be unable to add a new device to a particular communication session if, for example, the new device is not registered to the account of the participant. In this instance, the participant may have to first register the new device to their account to use the new device in the communication session.

In the subject systems and methods, a vouching process is provided for a participant in a group communication session to vouch for devices that are not registered to an account of the participant. For example, in one or more implementations, for a communication session that includes participants Alice and Bob, Alice can vouch for (e.g., and invite as an additional participant or handoff a connection to) a new device that might not be registered to the same account as Alice (e.g., a public device, car, web client, anonymous participant, etc.). Rather than requiring Bob to validate the new participant based on account registration for admission into the communication session, Alice can provide Bob with a voucher that Bob can use to confirm that the new device is vouched for by Alice (for handoff or for inclusion in the group communication session as a separate participant).

Figure 1:
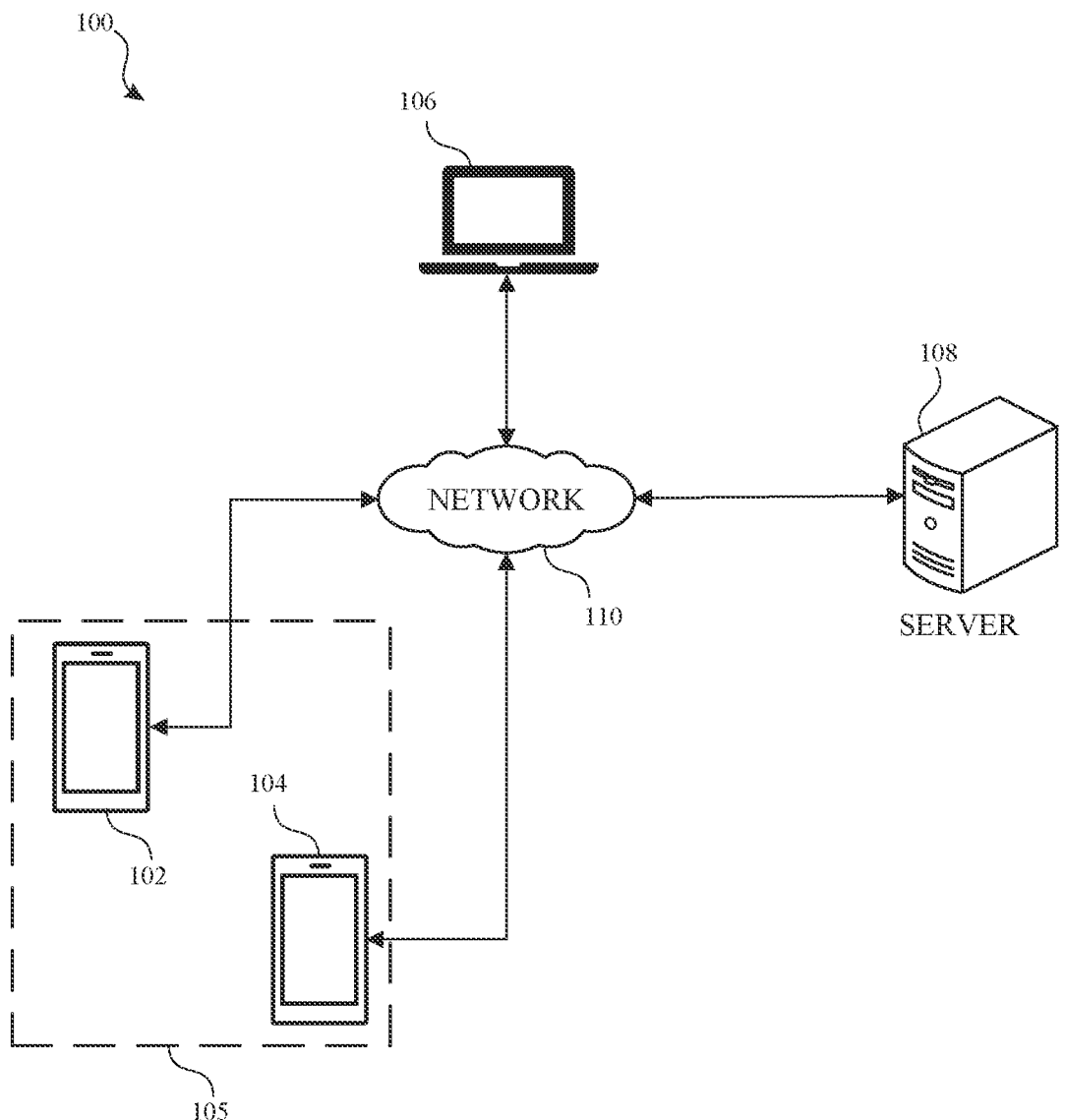
FIG. 1 illustrates an example network environment for communication sessions in which a device may be vouched for by a device participating in the group communication session, in accordance with one or more implementations.

FIG. 1 illustrates an example network environment 100 for communication sessions in which a device may be vouched for by a device participating in the group communication session, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, an electronic device 104, an electronic device 106, and one or more servers, such as a server 108. The network 110 may communicatively (directly or indirectly) couple the electronic device 102, the electronic device 104, the electronic device 106, and/or the server 108. In one or more implementations, the network 110 may be an interconnected network of devices that may include, or may be communicatively coupled to, the Internet. For explanatory purposes, the network environment 100 is illustrated in FIG. 1 as including the electronic device 102, the electronic device 104, the electronic device 106, and the server 108; however, the network environment 100 may include any number of electronic devices and/or any number of servers communicatively coupled to each other directly or via the network 110.

The electronic device 102 may be, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 102 may include a conferencing module (and/or circuitry) and one or more applications. In FIG. 1, by way of example, the electronic device 102 is depicted as a smartphone. The electronic device 102 may be, and/or may include all or part of, the electronic system discussed below with respect to FIG. 7. In one or more implementations, the electronic device 102 may include a camera and a microphone and may provide the conferencing module or application for obtaining and/or exchanging user communications data such as audio streams and/or video streams over the network 110, such as with a corresponding conferencing module or application that is installed and accessible at, for example, electronic device 104, and/or electronic device 106.

The electronic device 104 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, NFC radios, and/or other wireless radios. In one or more implementations, the electronic device 104 may include a conferencing module and one or more applications. In FIG. 1, by way of example, the electronic device 104 is depicted as a smartphone. The electronic device 104 may be, and/or may include all or part of, the electronic system discussed below with respect to FIG. 7.

In one or more implementations, the electronic device 104 may include a camera and a microphone and may provide the conferencing module for obtaining and/or exchanging user communications data such as audio streams and/or video streams over the network 110, such as with a corresponding conferencing module that is installed and accessible at, for example, electronic device 102, electronic device 114, and/or electronic device 106. The electronic device 104 may be in a location that is nearby the electronic device 102 for directly sending and/or receiving messages with electronic device 102, such as Bluetooth messages or other near field communications. The electronic device 104 may be a participant in a group communication session 105 with the electronic device 102, in which the electronic device 102 and electronic device 104 may exchange data synchronously and/or asynchronously.

The electronic device 106 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, NFC radios, and/or other wireless radios. In one or more implementations, the electronic device 106 may include a conferencing module and one or more applications. In FIG. 1, by way of example, the electronic device 106 is depicted as a laptop. The electronic device 106 may be, and/or may include all or part of, the electronic system discussed below with respect to FIG. 7. In one or more implementations, the electronic device 106 may include a camera and a microphone and may provide the conferencing module or application for obtaining and/or exchanging user communications data such as audio streams and/or video streams over the network 110. The electronic device 106 may not be a participant in the group communication session 105 unless the electronic device 106 receives an invitation to join, becomes registered with a user account of a participant, or is vouched for by a participant as described in the subject technology.

In one or more implementations, one or more servers (e.g., the server 108) may perform operations for managing the secure exchange of user communications data and/or communication sessions data between various electronic devices (e.g., the electronic device 102, the electronic device 104, and/or the electronic device 106), such as during a group communication session 105 (e.g., an audio conferencing session or a video conferencing session). In some variations, the server 108 is a relay server (e.g., a quick relay server). In some variations, the server 108 includes one or more app-specific modules (e.g., plugins) that perform operations for a respective application (e.g., a video conferencing application). In some variations, the server 108 includes one or more push modules for providing asynchronous notifications to one or more electronic devices (e.g., publish-subscribe messaging).

In one or more implementations, the server 108 may store account information (e.g., account, handles, or any other account-specific data) associated with the electronic device 102, the electronic device 104, the electronic device 106, and/or users thereof. In one or more implementations, one or more servers (e.g., the server 108) may provide content (e.g., media content, application content, or any other suitable data) that is to be processed at a participant device (e.g., the electronic device 102 and/or the electronic device 104) by an application or operating system of the participant device.

Figure 2:
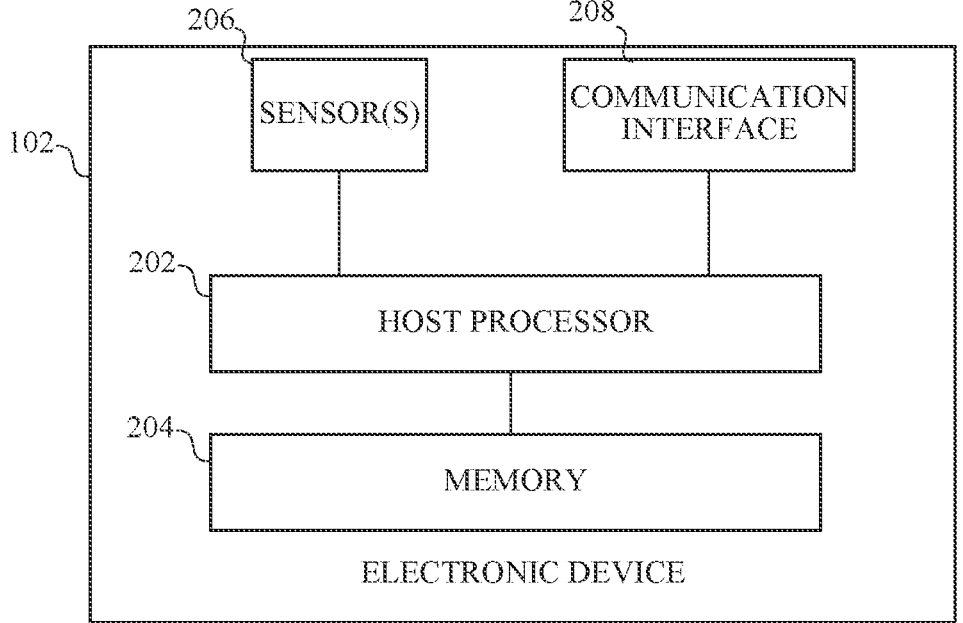
FIG. 2 depicts an example electronic device that may implement the subject methods and systems, in accordance with one or more implementations.

FIG. 2 depicts an electronic device 102 that may implement the subject methods and systems, in accordance with one or more implementations. For explanatory purposes, FIG. 2 is primarily described herein with reference to the electronic device 102 of FIG. 1. However, this is merely illustrative, and features of the electronic device of FIG. 2 may be implemented in any of the electronic device 104, the electronic device 106, and/or any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The electronic device 102 may include one or more of a host processor 202, a memory 204, one or more sensor(s) 206, and/or a communication interface 208. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store communication session data (e.g., as provided by the server 108) for participating in communication sessions with other electronic devices. The memory 204 may further store account information and any other type of identifier that associates the electronic device 102 with its corresponding user account and/or group communication sessions.

The sensor(s) 206 may include one or more microphones and/or cameras. The microphones may be used to facilitate the audio features of a communication session. For example, the microphones may obtain audio signals corresponding to the voice of a participant in a communication session (e.g., the group communication session 105). The cameras may be used to facilitate the video features of a communication session. For example, the cameras may obtain images of the face of a participant in a communication session (e.g., the group communication session 105).

The communication interface 208 may include suitable logic, circuitry, and/or code that enables wired or wireless communication, such as between the electronic device 102 and the server 108. The communication interface 208 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the sensor(s) 206, the communication interface 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
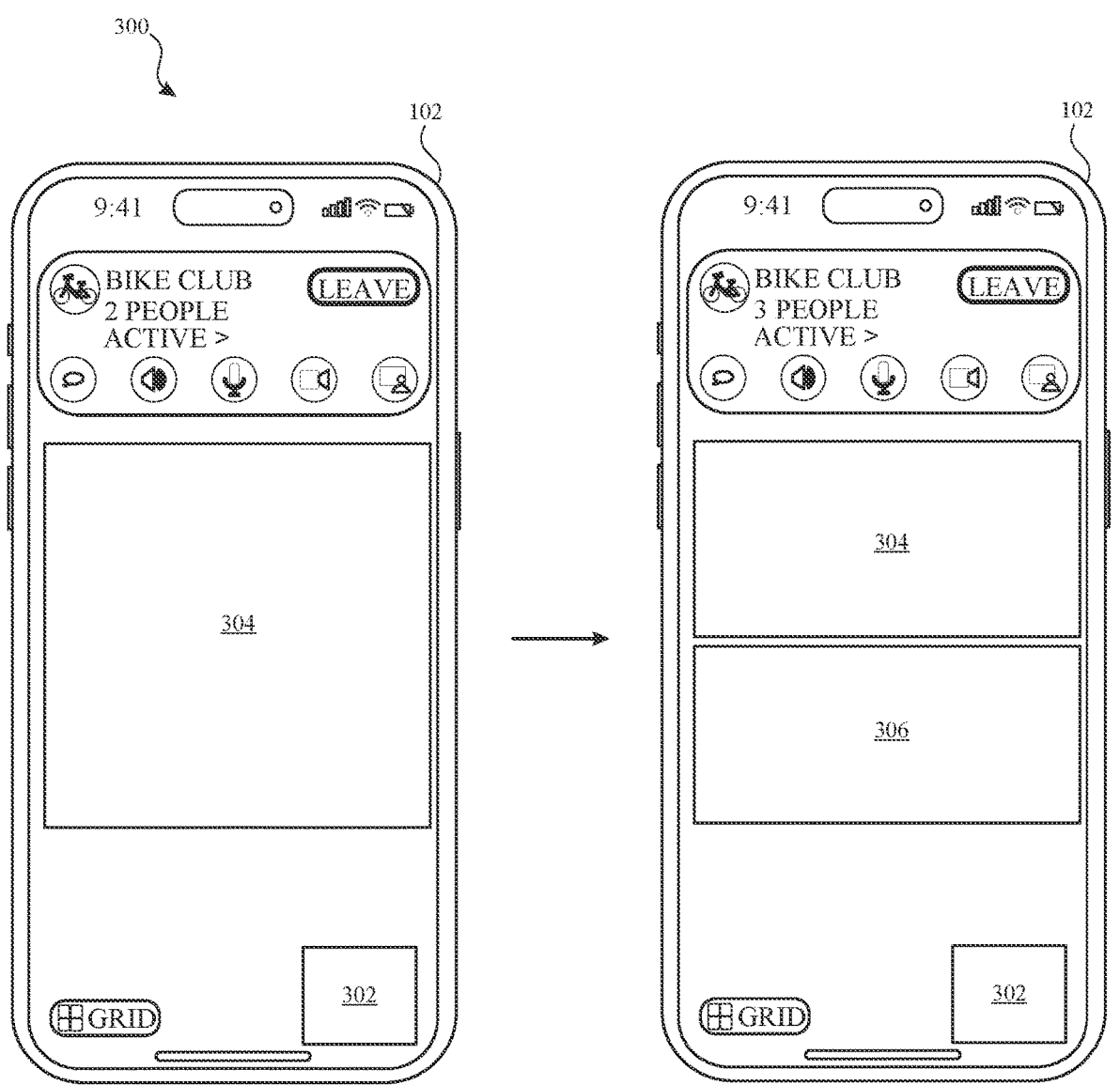
FIG. 3 depicts a schematic diagram of a use case in which a participant of a group communication session may first be presented with a first video feed from a first device and then the first video feed from the first device and a second video feed from a second device, in accordance with one or more implementations.

FIG. 3 depicts the example use case 300 in which a participant of a group communication session using a first device may first be presented a first video feed 302 from the first device and a second video feed 304 from a second device and then transition to include a third video feed 306 from a third device that was vouched for by the first or second device, in accordance with one or more implementations. It is contemplated that the electronic device 102 and the electronic device 104 may be any electronic device configured to engage in communication sessions, such as video communication sessions, audio communication sessions, phone calls, and/or the like.

As shown in the example of FIG. 3, the electronic device 102 is a smartphone participating in a video communication session. The electronic device 102 may also present a first video feed 302 generated from a sensor 206 on the electronic device 102, such as a camera. The electronic device 102 may present video feeds of the participants of the video communication session, such as a second video feed 304. In one or more implementations, the second video feed 304 is received from one or more respective electronic devices of one or more respective remote participants in the video communication session (e.g., the electronic device 104).

For example, the first video feed 302 may include a view of the face of the user of the electronic device 102 and the second video feed 304 may include a view of the face of the user of the electronic device 104. In the subject system, the electronic device 102 may vouch for the electronic device 106 so that the electronic device 106 may participate in the video communication session. The vouching results in the video feeds presented on the electronic device 102 also including a third video feed 306 transmitted from the electronic device 106, as shown in the electronic device 102 on the right in FIG. 3. It is understood that, although three video feeds of three electronic devices (e.g., the electronic device 102, the electronic device 104, and the electronic device 106) participating in a video communication session are shown, more than or less than three video feeds may be displayed for more than or less than three participants in the video communication session. In the example of FIG. 3, the electronic device 102 vouches for the electronic device 106, and the electronic device 106 (providing the third video feed 306) is added to the communication session with the electronic device 102 (providing the first video feed 302) and the electronic device 104 (providing the second video feed 304).

In one or more other implementations, the electronic device 102 may vouch for the electronic device 106 so that the electronic device 102 may handoff the video communication session to the electronic device 106. In these handoff implementations, before the handoff, the first video feed 302 corresponding to the electronic device 102 may be displayed on the electronic device 104. After the handoff, at the electronic device 104, the first video feed 302 may be replaced with the third video feed 306 corresponding to the electronic device 106, to which the video communication session has been transferred by handoff. In one or more implementations, following the handoff, the electronic device 102 may discontinue generating the first video feed 302 and/or discontinue displaying the second video feed 304.

Figure 4:
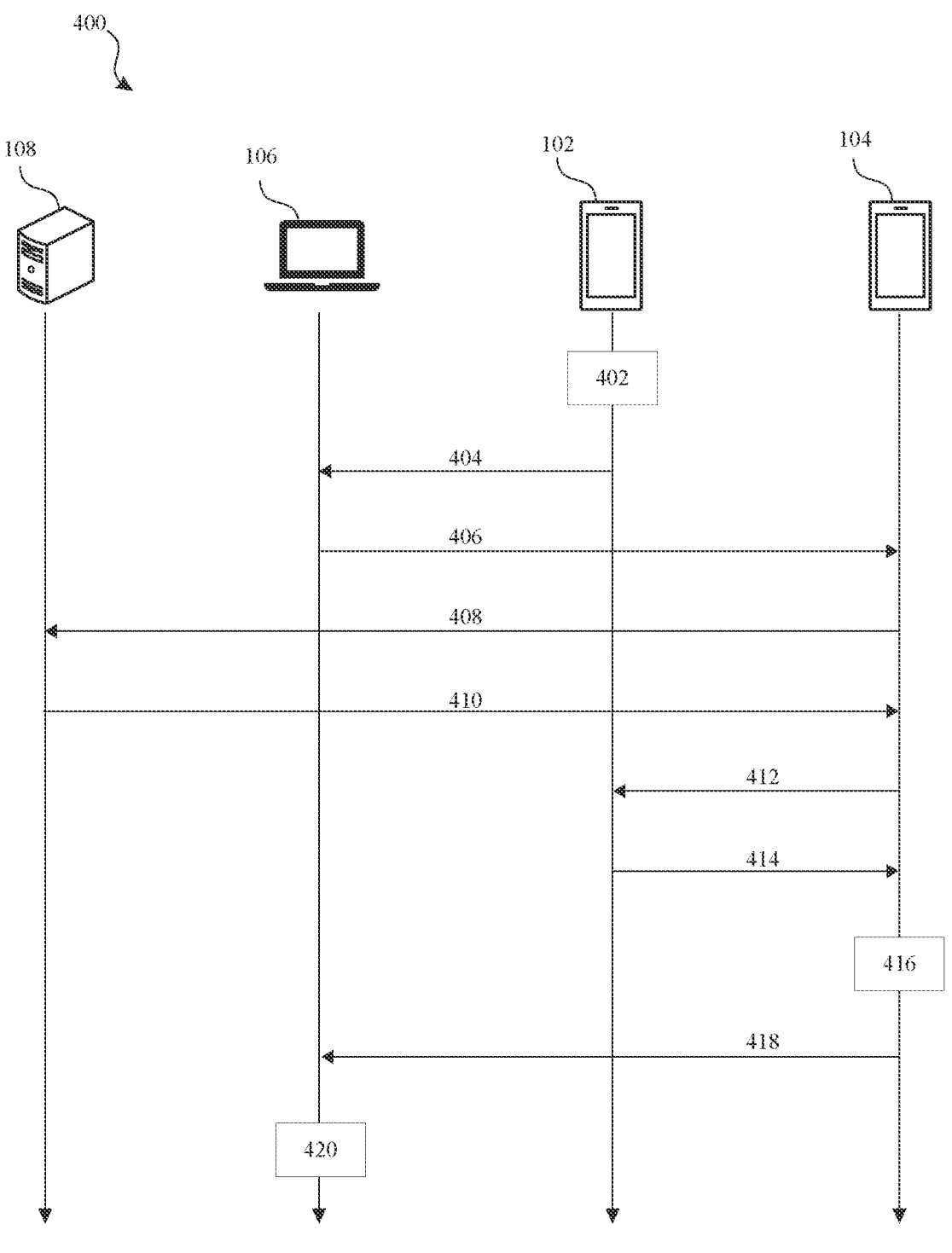
FIG. 4 depicts a sequence diagram of an example sequence for vouching for an electronic device, in accordance with one or more implementations.

FIG. 4 depicts a sequence diagram of an example sequence 400 for vouching for an electronic device 106, in accordance with one or more implementations. For explanatory purposes, the sequence 400 is primarily described herein with reference to the devices shown and described with regard to FIGS. 1 and 2. However, the sequence 400 is not limited to components or devices described in FIG. 4, and one or more blocks (also referred to as steps, sequences, or operations) of the sequence 400 may be performed by one or more other components and/or by other suitable devices. In addition, the blocks of the sequence 400 need not be performed in the order shown and/or one or more blocks of the sequence 400 need not be performed and/or can be replaced by other operations.

At block 402, the electronic device 102 may generate a voucher data item to vouch for the electronic device 106. The electronic device 102 may be participating in a group communication session with the electronic device 104, and the electronic device 106 may not be participating in the group communication session. The electronic device 106 may be any device capable of participating in a group communication session with the electronic device 102 and the electronic device 104. In one or more implementations, the electronic device 106 may be a device in proximity to the electronic device 102 so that the voucher data item may be sent to the electronic device 106 via Bluetooth. In one or more implementations, the electronic device 106 may be a video streaming device and/or a set-top box device that may be configured to participate in the group communication session without providing an audio and/or video stream, such as to synchronize a video being viewed by each of the participants.

For example, the electronic device 106 may be a shared device such as a public computer or a video conferencing system, and the electronic device 102 and/or the electronic device 104 may be in a group communication session. The group communication session may be a video call, and the electronic device 102 may handoff the video call from the electronic device 102 to the electronic device 106 that has been vouched for, although the electronic device 106 is not registered to the user account associated with the electronic device 102.

The voucher data item may be generated by the electronic device 102 and may include participant information associated with the participation of the electronic device 102 in the group communication session (e.g., the group communication session 105). The participant information associated with the participation of the electronic device 102 in the group communication session includes one or more group communication session participant identifiers associated with the group communication session and/or the electronic device 102. For example, the voucher data item may include a session-specific participant identifier and a stream identifier that are both associated with the communication session and the electronic device 102. Also included may be an expiration time that can be used to determine whether the voucher data item is expired. For example, the voucher data item may include a time that it was created as well as a time-to-live value that represents a period of time from creation that the voucher data item should exist before being discarded or otherwise invalidated.

The voucher data item may be signed with a key associated with the electronic device 102. Signing may include generating a digital signature for verifying the integrity of the voucher data item. For example, the electronic device 102 may sign the voucher data item with its private key such that the contents of the voucher data item may be verified with a corresponding public key of the electronic device 102. Signing may also or instead include securing the voucher data item (e.g., encrypting) with the key. Block 402 is discussed in further detail below with regard to FIG. 5.

At operation 404, the voucher data item may be sent from the electronic device 102 to the electronic device 106. It should be understood that the voucher data item may be sent from any device participating in the group communication session to any device not participating in the group communication session. The voucher data item may be sent to the electronic device 106 directly or indirectly. For example, the voucher data item may be transmitted to the electronic device 106 directly via Bluetooth. As another example, the voucher data item may be relayed to the electronic device 106 through the server 108, which may perform operations on the voucher data item (e.g., security and/or integrity checks). Operation 404 is discussed in further detail with regard to FIG. 5.

At operation 406, the voucher data item may be provided to one or more participants in the group communication session to verify that the electronic device 106 is vouched for by the electronic device 102 for participation in the group communication session. The voucher data item may be sent to the electronic device 104 (or any other device participating in the group communication session) device directly or indirectly. For example, the voucher data item may be transmitted to the electronic device 104 directly via Bluetooth or indirectly through the server 108, the electronic device 102, and/or the like.

In one or more implementations, the electronic device 104 may retrieve or access a database or device to receive the voucher data item. For example, the voucher data item may be stored in the server 108 and can be downloaded by the electronic device 104 via the Internet. Other examples include, accessing a removable storage device (e.g., a USB drive), a network-attached storage device (e.g., over a wired connection), and/or any other method of receiving data. Operation 406 is discussed in further detail with regard to FIGS. 5 and 6.

At operation 408, the verifying device (e.g., the electronic device 104) may retrieve a key associated with the device that generated the voucher (e.g., the electronic device 102). The voucher data item may be signed with a key associated with the device that generated the voucher data item (e.g., the electronic device 102). For example, the voucher data item may include a signature generated by the electronic device 102 with its private key such that the contents of the voucher data item may be verified with a corresponding public key of the electronic device 102. Accordingly, the key to be retrieved may be a public key associated with the electronic device 102.

To retrieve the key associated with the device that generated the voucher data item, the device performing the verification of the voucher data item (e.g., the electronic device 104) may query a device management server for the key. The device management server may be a server (e.g., server 108) that stores information related to user accounts and associated device identifiers and public keys. Operation 408 is discussed in further detail with regard to FIG. 6.

At operation 410, the server 108 may send the key associated with the electronic device 102 to the electronic device 104. The key may be sent to the electronic device 102 directly or indirectly. For example, the key may be sent directly to the electronic device 102 via a wired or wireless connection. As another example, server 108 may instruct another device to send the key to the electronic device 102.

Additionally or alternatively, the device performing the verification of the voucher data item (e.g., the electronic device 104) may receive the key from the device that generated the voucher data item (e.g., the electronic device 102). For example, the device performing the verification of the voucher data item (e.g., the electronic device 104) may request and receive the key from the device that generated the voucher data item (e.g., the electronic device 102). As another example, the devices participating in the group communication session may exchange the relevant keys for generating and/or verifying vouchers when the respective devices begin participating in the group communication session. Operation 410 is discussed in further detail with regard to FIG. 6.

At operation 412, the verifying device (e.g., the electronic device 104) may retrieve participant information associated with the participation of the device that generated the voucher (e.g., electronic device 102). The electronic device 104 retrieves the participant information to verify the accuracy of the participant information included in the voucher data item received in operation 406. The participant information may be information associated with the participation of the device that generated the voucher data item (e.g., the electronic device 102) in the group communication session. The participant information may be obtained by the device performing the verification (e.g., the electronic device 104) through its participation in the group communication session. For example, if the group communication session takes place on a messaging application, the participant information may be sent as a message on the messaging application or as a group communication session control message that facilitates the group communication session. Operation 412 is discussed in further detail with regard to FIG. 6.

At operation 414, the device that generated the voucher (e.g., the electronic device 102) may send its participant information to the verifying device (e.g., electronic device 104) for verifying the voucher data item. The participant information may be sent to the electronic device 104 directly or indirectly. For example, the participant information may be sent directly to the electronic device 104 via the group communication session. As another example, the electronic device 102 may generate a group communication session control message to send to a group communication session server (e.g., the server 108) for forwarding to the participants of the group communication session (e.g., electronic device 104).

Additionally or alternatively, the device performing the verification of the voucher data item (e.g., the electronic device 104) may receive the participant information from one or more other devices participating in the group communication session. For example, the devices participating in the group communication session may exchange their respective participant information for the group communication session when the respective devices begin participating in the group communication session. Operation 414 is discussed in further detail with regard to FIG. 6.

At block 416, the voucher data item is verified. The electronic device 104 may compare the participant information included in the voucher data item from the electronic device 106 to the participant information received from the electronic device 102 (e.g., at the start of the communication session) to verify that the electronic device 102 has vouched for the electronic device 106 to join the group communication session. Because knowledge of the participant information in a particular communication session is limited to the participants of the communication session, the electronic device 106 can be trusted as having been vouched for by the electronic device 102 if the participant information that the electronic device 106 sent via the voucher data item at operation 406 is the participant information of the electronic device 102 in the particular communication session.

In one or more implementations, the electronic device 104 may further determine whether the voucher data item is expired. The voucher data item may include an expiration time to determine whether the voucher data item is expired. For example, the voucher data item may include a time, after the voucher data item was created, that the voucher data item is no longer valid. If it is determined that the voucher data item is expired, the electronic device 106 may not be permitted to join the group communication session. Block 416 is discussed in further detail with regard to FIG. 6.

At operation 418, the verifying device (e.g., the electronic device 104) may provide an indication to the new device (e.g., the electronic device 106) that it may join the group communication session. The indication may include a link, a message, a signal, or any other signal to the electronic device 106 that it may join the group communication session. Alternatively, the electronic device 104 may automatically include the electronic device 106 upon determining that it has been properly vouched for. In one or more implementations, the electronic device 104 may send a join message incorporating the electronic device 106 into the group communication session to join the electronic device 106 into the group communication session. The join message is any message that incorporates the electronic device 106 into the group communication session such that the electronic device 106 may send and/or receive data as a participant in the group communication session.

At block 420, the new device (e.g., the electronic device 106) may join the group communication session. The electronic device 106 may present a UI element on an electronic display indicating that it has been vouched for. The indication may include a notice that the electronic device 106 has been vouched for by the electronic device 102. The indication may also include a notice of the participants of the group communication session. The UI element may be confirmed, denied, or ignored. If the UI element is confirmed or ignored, the electronic device 106 may continue to join the group communication session; otherwise, the electronic device 106 may remain outside of the group communication session. In one or more implementations, the electronic device 106 may also send a notification to one or more of the participants of the group communication session indicating that it is associated with the electronic device 102.

Figure 5:
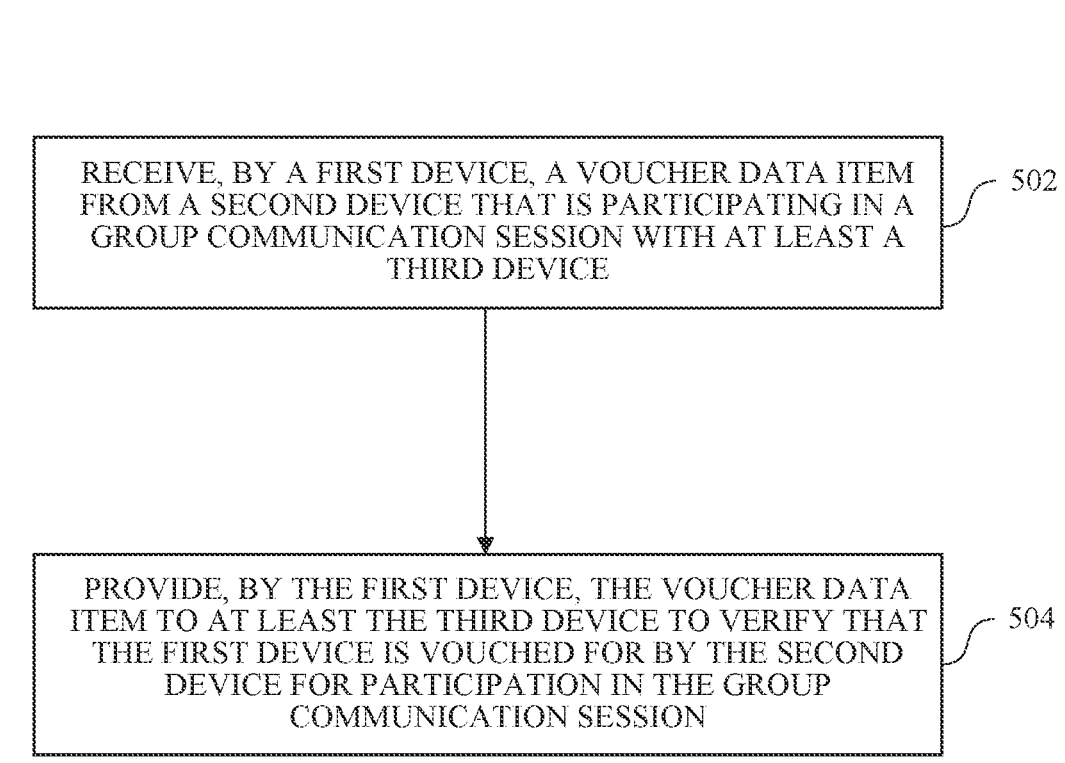
FIG. 5 depicts a flow diagram of an example process for creating a voucher by a first device that is participating in a group communication session, in accordance with one or more implementations.

FIG. 5 depicts a flow diagram of an example process 500 for creating a voucher by a first device (e.g., electronic device 102) that is participating in a group communication session, in accordance with one or more implementations. For explanatory purposes, the process 500 is primarily described herein with reference to the electronic device 102 of FIGS. 1 and 2 as well as the electronic device 104 and electronic device 106 of FIG. 1. However, the process 500 is not limited to the electronic device 102, electronic device 104, and/or electronic device 106, and one or more blocks (also referred to as operations) of the process 500 may be performed by one or more other components of the electronic device 102, and/or by other suitable devices. Further, for explanatory purposes, the blocks of the process 500 are described herein as occurring sequentially or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, a voucher data item is received. The voucher data item may be received by a first device (e.g., the electronic device 106) from a second device (e.g., the electronic device 102) that is participating in a group communication session with at least a third device (e.g., the electronic device 104). The voucher data item may be generated by the second device and include participant information associated with the participation of the second device in the group communication session. The participant information associated with the participation of the second device in the group communication session may include one or more group communication session participant identifiers associated with the group communication sessions and/or the second device. For example, the voucher data item may include a session-specific participant identifier and a stream identifier that are both associated with the communication session and the second device. Also included in the voucher data item may be an expiration time to determine whether the voucher data item is expired. For example, the voucher data item may include a time that the voucher data item was created as well as a time-to-live value that represents a period of time from creation that the voucher data item should exist before being discarded.

The voucher data item may be signed with a key associated with the second device. For example, the second device may sign the voucher data item (e.g., by generating a signature) with its private key such that the contents of the voucher data item may be verified with a corresponding public key of the second device.

The voucher data item may be sent to the first device directly or indirectly. For example, the voucher data item may be transmitted to the new device directly via Bluetooth. As another example, the voucher data item may be relayed to the first device through an intermediary server (e.g., server 108) that can perform operations on the voucher data item (e.g., security and/or integrity checks). The voucher data item may also or instead be accessed by the first device from a repository, a removable storage device, or any other device capable of storing voucher data items.

In one or more implementations, the process 500 may be a fallback process that is performed in response to a standard invitation to the group communication session failing to perform successfully. In such case, before or while receiving a voucher data item, the first device may receive an invitation to participate in the group communication session from the second device. After the invitation is received, it may be determined whether an account associated with the first device is different than an account associated with the second device. The determination of whether the first device and second device are associated with different accounts may be based on an account identifier associated with the second device, which may be included with the invitation sent to the first device. If it is determined that the first device and second device are associated with different accounts, the second device may vouch for the first device as a device that the other participants in the group communication session (e.g., the third device) can trust. To vouch for the first device, the process 500 may be performed.

At block 504, the voucher data item may be provided to at least the third device to verify that the first device is vouched for by the second device for participation in the group communication session. The voucher data item may be sent to the third device (or any other device participating in the group communication session) device directly or indirectly. For example, the voucher data item may be transmitted to the third device directly via Bluetooth or indirectly through an intermediary server (e.g., server 108) that can perform operations on the voucher data item (e.g., security and/or integrity checks).

To provide the voucher data item to at least the third device, the first device may generate a group communication session control message. The first device may send the group communication session control message to a group communication session service that is configured to forward the group communication session control message to the second device and/or the third device. The group communication session service may be operated by a server (e.g., server 108) that coordinates the activity of the group communication session between the second and third devices. In this way, the voucher data item may be transmitted to the third device indirectly. For example, the communication session control message may be sent via a push message on a wide area network.

In one or more implementations, the process 500 may further include allowing the first device to join the group communication session after the voucher of the first device is verified by the third device (e.g., the third device has not performed verification, or the verification has failed). The second device and/or the third device may present a notification that the first device is joining the group communication session and/or that the first device is associated with the second device. The notification may in response to receiving and verifying the voucher data item from the first device (e.g., at block 504). Because the voucher data item includes identifiers associated with the second device, the identifiers associated with the second device may indicate to the device receiving the notification that the first device may be associated with the second device. For example, the notification may cause a UI element to display a notification on an electronic display of one or more participants of the group communication session stating that "maybe second device's device 'first device' has joined the group communication session" when the identifiers in the voucher data item belong to the second device, which indicates that the first device may be associated with the second device.

FIG. 6 depicts a flow diagram of an example process 600 for validating a voucher by a first device that is participating in a group communication session, in accordance with one or more implementations. For explanatory purposes, the process 600 is primarily described herein with reference to the electronic device 102 of FIGS. 1 and 2 as well as the electronic device 104 and electronic device 106 of FIG. 1. However, the process 600 is not limited to the electronic device 102, electronic device 104, and/or electronic device 106, and one or more blocks (also referred to as steps or operations) of the process 600 may be performed by one or more other components of the electronic device 102, and/or by other suitable devices. Further, for explanatory purposes, the blocks of the process 60 are described herein as occurring sequentially or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, a voucher data item may be received. The voucher data item may be received by a first device (e.g., the electronic device 104) participating in a group communication session from a second device (e.g., the electronic device 106) not participating in the group communication session with the first device. The voucher data item may be generated by a third device (e.g., the electronic device 102) that is participating in the group communication session with the first device.

The voucher data item may include participant information associated with participation of the third device in the group communication session. The participant information associated with the participation of the third device in the group communication session may include one or more group communication session participant identifiers associated with one or more of the group communication session and the third device. For example, the voucher data item may include a session-specific participant identifier and a stream identifier that are both associated with the communication session and the third device. Also included in the voucher data item may be an expiration time to determine whether the voucher data item is expired. For example, the voucher data item may include a time that the voucher data item was created as well as a time-to-live value that represents a period of time from creation that the voucher data item should exist before being discarded.

The voucher data item may be sent to the first device directly or indirectly. For example, the voucher data item may be transmitted to the new device directly via Bluetooth. As another example, the voucher data item may be relayed to the first device through an intermediary server (e.g., server 108) that can perform operations on the voucher data item (e.g., security and/or integrity checks). In one or more implementations, the voucher may be included in a group communication session control message, where a group communication session control message includes any message sent to and/or from a device for facilitation of the group communication session (e.g., by the server 108).

At block 604, a key associated with the third device may be retrieved. The voucher data item may be signed with a key associated with the third device. For example, the voucher data item may include a signature generated by the third device with its private key such that the contents of the voucher data item may be verified with a corresponding public key of the third device. Accordingly, the key to be retrieved may be a public key associated with the third device. To retrieve the key associated with the third device, the first device may query a device management server for the public key associated with the third device. The device management server may be a server (e.g., server 108) that stores information including user accounts and associated device identifiers and public keys.

At block 606, a second participant information may be obtained. The second participant information may be the information that is used to verify the accuracy of the first participant information. The second participant information may be participant information associated with the participation of the third device in the group communication session. The second participant information may be obtained by the first device through its participation in the group communication session. For example, participant information may be exchanged between the participant devices when they join the communication session.

At block 608, the voucher data item is verified based on a comparison of the first and second participant information to verify that the third device has vouched for the second device to join the group communication session. Because knowledge of the participant information of the third device in a particular communication session is limited to the participants of the communication session, the second device can be trusted as having been vouched for by the third device if the first participant information is the actual participant information of the third device in the particular communication session.

In one or more implementations, the first participant information may be taken directly from the voucher data item. In such implementations, the voucher data item may include a signature generated by the third device. To verify the voucher data item, the first device verifies that the first participant information and the second participant information match. Alternatively, the first device may verify that the first participant information and the second participant information have predetermined categories of information from the participant information that match. In addition, the first device may verify the digital signature generated by the third device based on the key retrieved at block 604.

Additionally or alternatively, the first device may derive the first participant information from the voucher data item with the key associated with the third device. For example, the first participant information or cryptographic representations thereof (e.g., a hash) may be encrypted with the private key of the third device, and thus the first participant information may be derived by decrypting the first participant information from the voucher data item with the public key of the third device. The first device may then obtain the second participant information or generate cryptographic representations thereof (e.g., a hash), compare the sets of information (e.g., the first and second participant information in their original or cryptographic form), and consider the signature valid if the sets of information are matching.

In one or more implementations, the process 600 may further include determining whether the voucher data item is expired. The voucher data item may include an expiration time to determine whether the voucher data item is expired. For example, the voucher data item may include a time, after the voucher data item was created, that the voucher data item is no longer valid. If it is determined that the voucher data item is expired, the first device may reject the second device. For example, the first device may determine that the voucher data item is valid and that the second device had at one point been vouched for by the third device; however, the first device may prevent the first device from joining the group communication session until it presents an unexpired voucher data item or otherwise is permitted to join the group communication session (e.g., becomes registered to the same user account as a device participating in the group communication session or separately joins the communication session as a standalone new participant device).

In one or more implementations, the process 600 may further include receiving a group communication session control message that includes a join message requesting the incorporation of the second device into the group communication session. The group communications session control message may be the same message that delivered the voucher data item. The second device may join the first device in the group communication session as the second device is being vouched for and/or in response to the voucher data item not being verified (e.g., the third device has not performed verification, or the verification has failed). To join the group communication session as the second device is being vouched for, the group communication session control message may further include a join message requesting the incorporation of the second device into the group communication session (e.g., in addition to the voucher data item). The join message is any message that incorporates the second device into the group communication session such that the second device may send and/or receive data as a participant in the group communication session. The sending of the join message is not limited to the group communication session control message.

In one or more implementations, the group communication session control message may include a notification indicating that the second device is associated with the third device. The notification may be used to make the participants in the group communication session aware of a new device (e.g., the second device) joining the group communication session. The group communication session control message may be sent to one or more participants of the group communication session (e.g., the first device). In one or more implementations, the voucher data item included in the group communication session control message may be a notification to the first device and/or third device that the new device joining the group communication session (i.e., the first device) is associated with the second device, as the voucher data item includes identifiers associated with the second device.

As described above, one aspect of the present technology is the gathering and use of data available from specific and legitimate sources for cryptographic participant vouching. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for cryptographic participant vouching. Accordingly, the use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of the cryptographic participant vouching, the present technology can be configured to allow users to select to "opt-in" or "opt-out" of participation in the collection of personal information data during registration for services or anytime thereafter. In addition to providing "opt-in" and "opt-out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Figure 7:
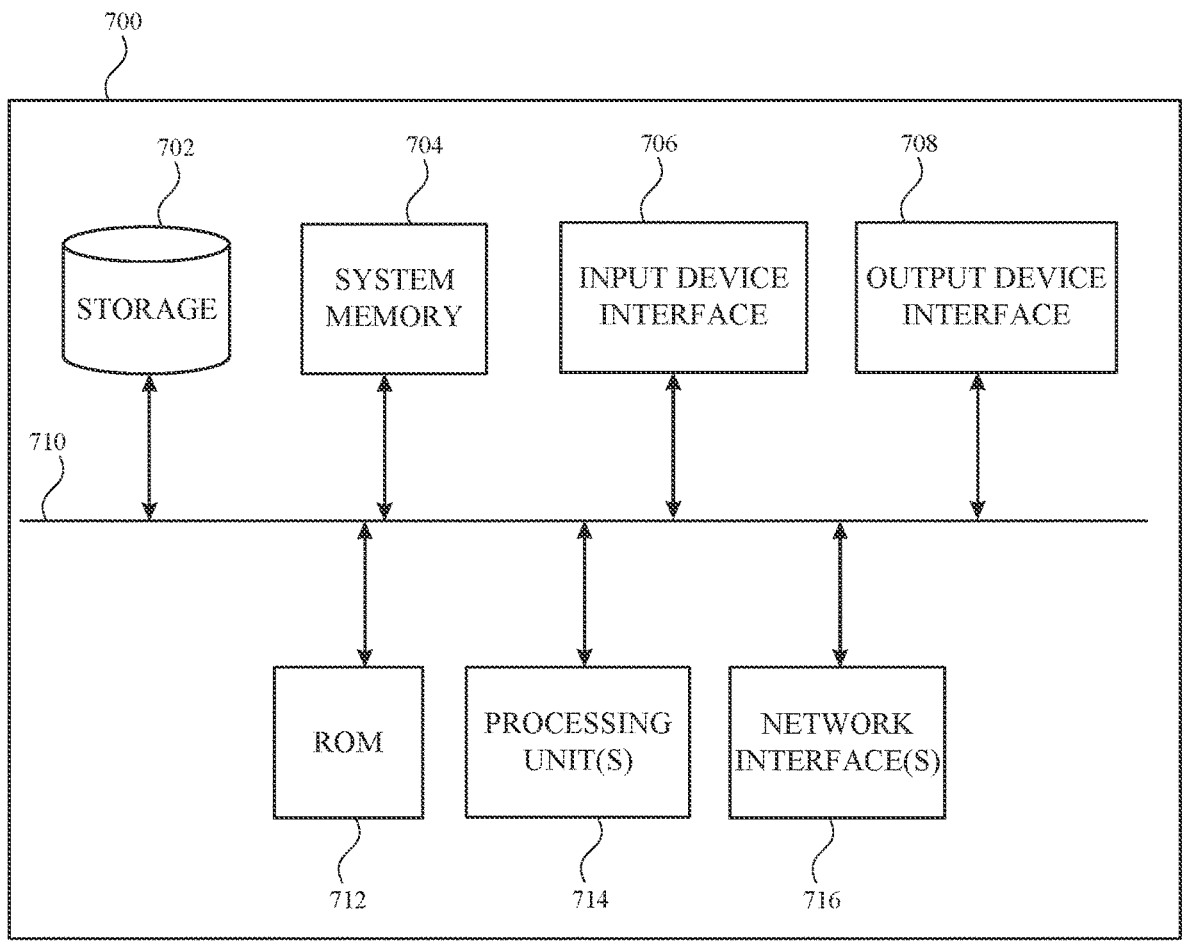
FIG. 7 depicts an example electronic system with which aspects of the present disclosure may be implemented, in accordance with one or more implementations.

FIG. 7 depicts an example electronic system 700 with which aspects of the present disclosure may be implemented. The electronic system 700 can be, and/or can be a part of, any electronic device for generating the features and processes described in reference to FIGS. 1-6, including but not limited to a laptop computer, tablet computer, smartphone, and wearable device (e.g., smartwatch, fitness band). The electronic system 700 may include various types of computer-readable media and interfaces for various other types of computer-readable media. The electronic system 700 includes one or more processing unit(s) 712, a persistent storage device 702, a system memory 704 (and/or buffer), an input device interface 714, an output device interface 706, a bus 708, a ROM 710, one or more processing unit(s) 712, one or more network interface(s) 716, and/or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the persistent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The persistent storage device 702, on the other hand, may be a read-and-write memory device. The persistent storage device 702 may be a non-volatile memory unit that stores instructions and data even when the electronic system 700 is off. In one or more implementations, a mass-storage device (such as a magnetic or optical disk and its corresponding disk drive) may be used as the persistent storage device 702.

In one or more implementations, a removable storage device (such as a floppy disk, flash drive, and its corresponding disk drive) may be used as the persistent storage device 702. Like the persistent storage device 702, the system memory 704 may be a read-and-write memory device. However, unlike the persistent storage device 702, the system memory 704 may be a volatile read-and-write memory, such as RAM. The system memory 704 may store any of the instructions and data that one or more processing unit(s) 712 may need at runtime. In one or more implementations, the processes of the subject disclosure are stored in the system memory 704, the persistent storage device 702, and/or the ROM 710. From these various memory units, the one or more processing unit(s) 712 retrieves instructions to execute and data to process in order to execute the processes of one or more implementations.

The bus 708 also connects to the input device interfaces 714 and output device interfaces 706. The input device interface 714 enables a user to communicate information and select commands to the electronic system 700. Input devices that may be used with the input device interface 714 may include, for example, alphanumeric keyboards, touch screens, and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. In this manner, the electronic system 700 can be a part of a network of computers (such as a LAN, a wide area network ("WAN"), an Intranet, or a network of networks, such as the Internet). Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, by a first device, a voucher data item, from a second device that is participating in a group communication session with at least a third device, wherein the voucher data item is received prior to participation of the first device in the group communication session with at least the third device, the group communication session including an exchange of audio data or video data between the second device and at least the third device, wherein:
    the voucher data item includes participant information obtained through participation of the second device in the group communication session, and
    the voucher data item is signed with a key associated with the second device; and
providing, by the first device, the voucher data item to at least the third device to verify that the first device is vouched for by the second device for participation in the group communication session.

2. The method of claim 1, further comprising:
receiving, by the first device and from the second device, an invitation to participate in the group communication session;
determining whether an account associated with the first device is different than an account associated with the second device, based on the invitation; and
receiving the voucher data item in response to determining that the account associated with the first device is different than the account associated with the second device.

3. The method of claim 1, wherein the voucher data item further includes an expiration time for determining whether the voucher data item is expired.

4. The method of claim 1, wherein the participant information associated with the participation of the second device in the group communication session includes one or more group communication session participant identifiers associated with one or more of the group communication session and the second device.

5. The method of claim 1, wherein the voucher data item includes a signature generated by the second device with a private key associated with the second device such that the signature is verifiable by a public key associated with the second device.

6. The method of claim 1, further comprising generating, by the first device, a group communication session control message including the voucher data item, wherein providing, by the first device, the voucher data item to at least the third device comprises providing the voucher data item to the third device via the group communication session control message.

7. The method of claim 6, wherein providing, by the first device, the voucher data item to at least the third device further comprises sending the group communication session control message to a group communication session service that is constructed to forward the group communication session control message to the second device and the third device.

8. The method of claim 6, wherein the group communication session control message further includes a join message requesting incorporation of the first device into the group communication session.

9. The method of claim 1, further comprising, in response to the voucher data item not being verified by the third device:

joining the group communication session in response to receiving a join message;

generating a group communication session control message including the voucher data item; and transmitting the group communication session control message to at least the second device and the third device.

10. The method of claim 9, wherein the group communication session control message includes a notification indicating that the first device is associated with the second device based on the voucher data item.

11. A method comprising:

receiving, by a third device and from a first device attempting to join a group communication session, a voucher data item for joining the group communication session between the third device and at least a second device, the group communication session including an exchange of audio data or video data between the second device and at least the third device, wherein the voucher data item is signed by the second device and includes first participant information obtained through participation of the second device in the group communication session;

retrieving, by the third device, a key associated with the second device;

obtaining, by the third device and through participation in the group communication session, second participant information associated with the participation of the second device in the group communication session; and verifying, by the third device, the voucher data item from the first device based on the key and a comparison of the first participant information obtained through participation of the second device in the group communication session and the second participant information obtained through participation of the third device in the group communication session to verify that the second device has vouched for the first device to join the group communication session.

12. The method of claim 11, wherein the key comprises a public key associated with the second device and the voucher data item includes a signature generated by the second device with a private key corresponding to the public key.

13. The method of claim 12, wherein retrieving the key associated with the second device includes querying a device management server for the public key associated with the second device.

14. The method of claim 11, wherein verifying the voucher data item includes:

deriving the first participant information from the voucher data item with the key associated with the second device; and determining that the first participant information matches the second participant information.

15. The method of claim 11, further comprising:

determining whether the voucher data item is expired based on an expiration time corresponding to the voucher data item; and rejecting the second device in response to determining that the voucher data item is expired.

16. The method of claim 11, wherein the first participant information associated with the participation of the second device in the group communication session includes one or more group communication session participant identifiers associated with one or more of the group communication session and the second device.

17. The method of claim 11, further comprising receiving a group communication session control message generated by the first device that includes a join message requesting incorporation of the first device into the group communication session.

18. The method of claim 11, wherein receiving the voucher data item comprises receiving, from the first device, a group communication session control message including the voucher data item.

19. The method of claim 18, wherein the group communication session control message comprises a notification indicating that the first device is associated with the second device.

20. A non-transitory computer-readable medium comprising computer-readable instructions that, when executed by a processor, cause the processor to perform one or more operations comprising:

receiving, by a first device, a voucher data item, from a second device that is participating in a group communication session with at least a third device, wherein the voucher data item is received prior to participation of the first device in the group communication session with at least the third device, the group communication session including an exchange of audio data or video data between the second device and at least the third device, wherein:

the voucher data item includes participant information obtained through participation of the second device in the group communication session, and the voucher data item is signed with a key associated with the second device; and providing the voucher data item to at least the third device to verify that the first device is vouched for by the second device for participation in the group communication session.

* * * * *